June 4, 1974  C. H. WALLACE  3,814,814
PROCESSING HOGS
Filed Jan. 11, 1972  3 Sheets-Sheet 3
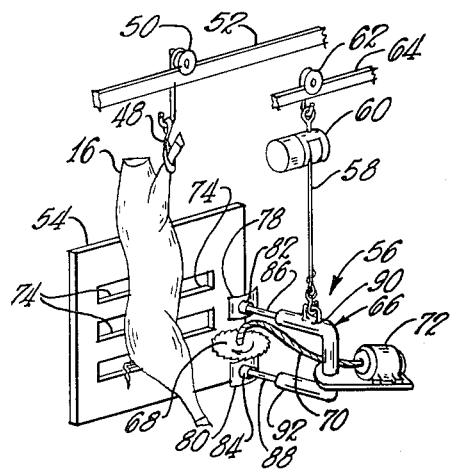
Fig. 3
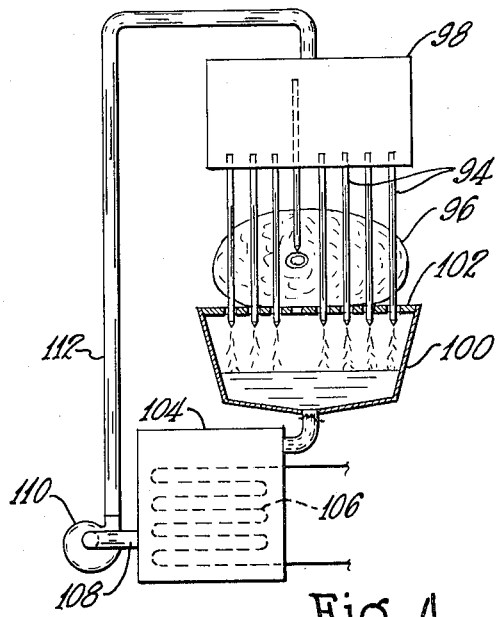
Fig. 4
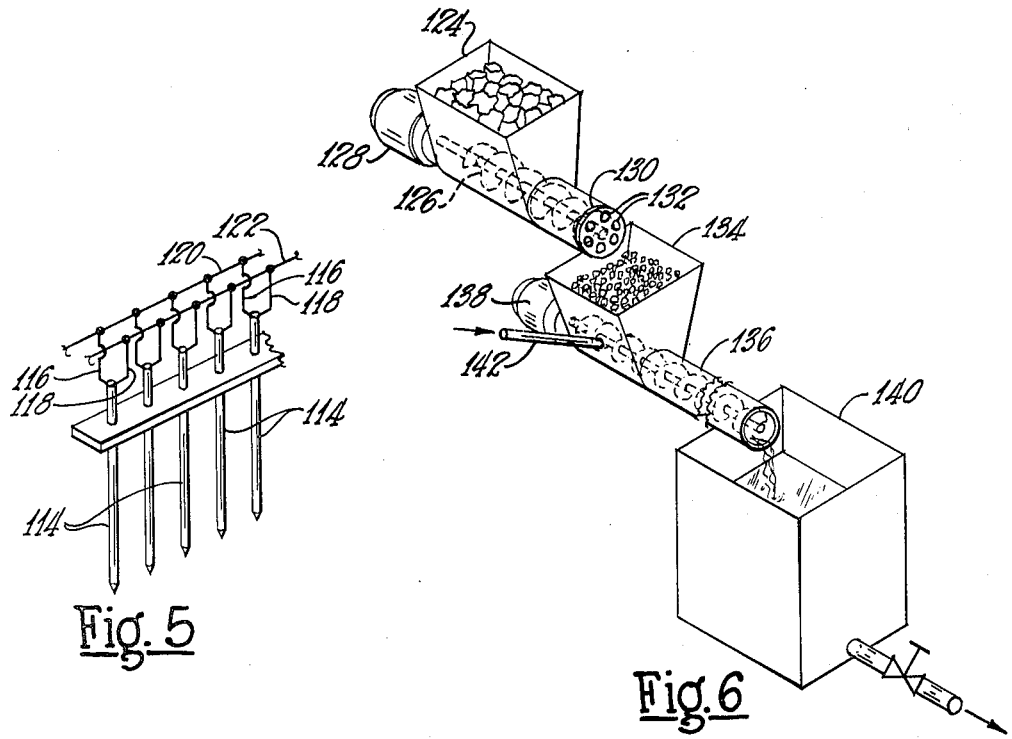
Fig. 5
Fig. 6
INVENTOR.
CHARLES H. WALLACE
BY
Allen D. Gutchess, Jr.
ATTORNEY

United States Patent Office

3,814,814
PROCESSING HOGS
Charles H. Wallace, Carrollton, Va., assignor to International Telephone and Telegraph Corporation, Nutley, N.J.
Continuation-in-part of abandoned application Ser. No. 101,900, Dec. 28, 1970. This application Jan. 11, 1972, Ser. No. 217,025
Int. Cl. A22c *18/00*
U.S. Cl. 426—2     5 Claims

ABSTRACT OF THE DISCLOSURE

A method of processing animals, specifically hogs, is provided. According to the method, after the hogs are slaughtered, de-headed, and eviscerated, they are quickly cooled to a temperature of only about 50°–60° F. and are then immediately divided into market cuts. The appropriate cuts to be heated are then internally heated by pumping hot brine into or through them and they are then further heated in continuous ovens or tunnels and brought to smoking or cooking temperature. They are then chilled, after they have been cooked at the desired temperature, by their temperature being lowered by pumping cold brine through them. Fresh cuts are wrapped and then chilled. The fat is also rendered immediately into lard. If desired, before the carcasses are cooled to about 50°–60° F., they can be inverted and the hams chopped off, leaving substantially less weight to be cooled and subsequently heated. The overall process is both rapid and continuous so that hogs brought in the morning are processed into products which are ready for the market the same evening.

---

This is a continuation-in-part of my copending application Ser. No. 101,900, entitled "Processing Animals," filed Dec. 28, 1970, now abandoned.

This invention relates to a method for processing animals for human consumption and specifically to a method for slaughtering and handling hogs.

Presently, after hogs are slaughtered, de-headed, and eviscerated, the carcasses are chilled over a lengthy period of time of sixteen to eighteen hours until the temperature of the thickest part of the carcasses (the hams) reach an internal temperature of 36°–38° F. During this cooling period, a shrinkage of about two percent results in the weight of the carcasses. After chilling, the carcasses are relayed to the cutting room where they are divided or broken up into primal or market cuts. Most of the cuts are then cured and cooked or smoked, being brought to an internal temperature of about 137° to 160° F. or more in the process. Fresh cuts are simply chilled, while the fat is usually chilled and then subsequently rendered.

In this process, considerable cooling and heating expenses are encountered since the entire carcass is chilled to about 38° F. and most of it, about seventy-two percent, is subsequently heated to about 137° to 160° F. Also, the shrinkage resulting in the hog carcass represents a significant loss in terms of market value. A large amount of labor is also expended in moving the carcasses and cuts into and out of the chilling rooms and smokehouses. Further, a considerable amount of space is required to handle the animals, which are in process over a period of several days, and substantial sums of money are tied up in inventory representing the various cuts being processed.

In accordance with the invention, the hogs are slaughtered, de-headed, eviscerated, and split in two in the usual manner, along with the usual operations of scalding, removing hair, washing, etc. At this time, however the carcasses are only cooled to a surface temperature of about 27° to 65° F. with an internal temperature of about 70° F., rather than being chilled to 38° F. or lower internally. This cooling is preferably done by flowing cold liquid over the carcasses for a relatively short period of time, this being rapid and also substantially eliminating shrinkage of the carcasses. Cooling to this temperature is only for the purpose of providing a sufficient degree of firmness in the fat and meat to enable the carcass to be divided cleanly into the primal or market cuts. Cooling can also be done using liquid or gaseous carbon dioxide, nitrogen or freon refrigeration, as well as by a cold air blast at about −30° F.

Most of the cuts are then cured and smoked or cooked to achieve an internal temperature of about 137° F. or more. To accomplish this, the appropriate cuts can be injected with a high temperature brine solution to bring the internal temperature up to about 120° F. with the additional heating then being accomplished in much less time than otherwise required to smoke or cook these cuts by the usual procedure, particularly when starting from an internal temperature of 38° F. The fresh cuts to be chilled are first wrapped in plastic film to substantially eliminate shrinkage, after which they are chilled, preferably in a continuous tunnel by the use of high-velocity air, liquid or gaseous carbon dioxide, nitrogen or freon to an internal temperature of 34° F. The fat which is to produce lard is immediately rendered after being cut from the carcasses to avoid any possible spoilage.

The hogs which are slaughtered in the morning are thereby processed into products ready for market by the end of the workday. This substantially reduces the space requirements for the processing facility and it also reduces the amount of money which would otherwise be tied up in large inventories of hogs, carcasses, and cuts-in-process. Further, the capacity of a given plant facility is greatly increased.

It is, therefore, a principal object of the invention to provide a process for handling animals which substantially reduces the cooling and heating requirements in the process.

Another object of the invention is to provide a rapid, continuous method for processing hogs.

A further object of the invention is to provide a process for handling hogs in which the hogs can be slaughtered in the morning and be processed into products ready for market by the end of the same day.

Yet another object of the invention is to provide a method for processing hogs in which the amount of shrinkage due to evaporation losses is substantially reduced.

Still a further object of the invention is to provide a method for processing hogs in which the amount of labor and space requirements are reduced, as well as the extent of inventory of meat in process.

Other objects and advantages of the invention will be apparent from the following detailed description of a preferred embodiment thereof, reference being made to the accompanying drawings, in which:

FIG. 3 is a somewhat schematic view in perspective of apparatus for separating hams from the carcasses, if desired, before the cooling step;

FIG. 4 is a schematic view in vertical cross section of apparatus for rapidly heating certain cuts of the hogs prior to smoking or cooking them;

FIG. 5 is a schematic view in perspective of a modification of the apparatus of FIG. 4; and FIG. 6 is a somewhat schematic view in perspective of apparatus for rendering fat into lard immediately after the fat is separated from the carcass.

In processing a hog, one of the rear feet is shackled and the hog is hung from an overhead conveyor. After stunning, the hog is stuck and bled, with the carcass then placed in a bath of scalding water and de-haired. The carcass can then be washed and singed or shaved to remove the remaining hair, or other depilatory methods can be used for this purpose. The carcass is then de-headed and eviscerated, after which it is usually split in two and rough trimmed.

According to the usual process for handling hogs, the carcass is then moved to a chilling room where it is chilled to an internal temperature of 36°–38° F. in the thickest parts of the hog. This is commonly accomplished by flowing air over refrigeration coils and discharging it into the chilling room above the carcass. This cooling operation takes sixteen to eighteen hours or more and results in shrinkage in the weight of the carcass of about one and one-half percent to two and one-half percent, averaging about two percent. After breaking the chilled carcass into primal or maket cuts, most are then smoked or cooked, being heated from an internal temperature of about 38° F. to about 137° to 160° F. over a lengthy period of time. The cuts are then chilled again to a low temperature over a period of time in a cold storage room. The fat is similarly chilled and then heated again when being rendered.

Figure 1:
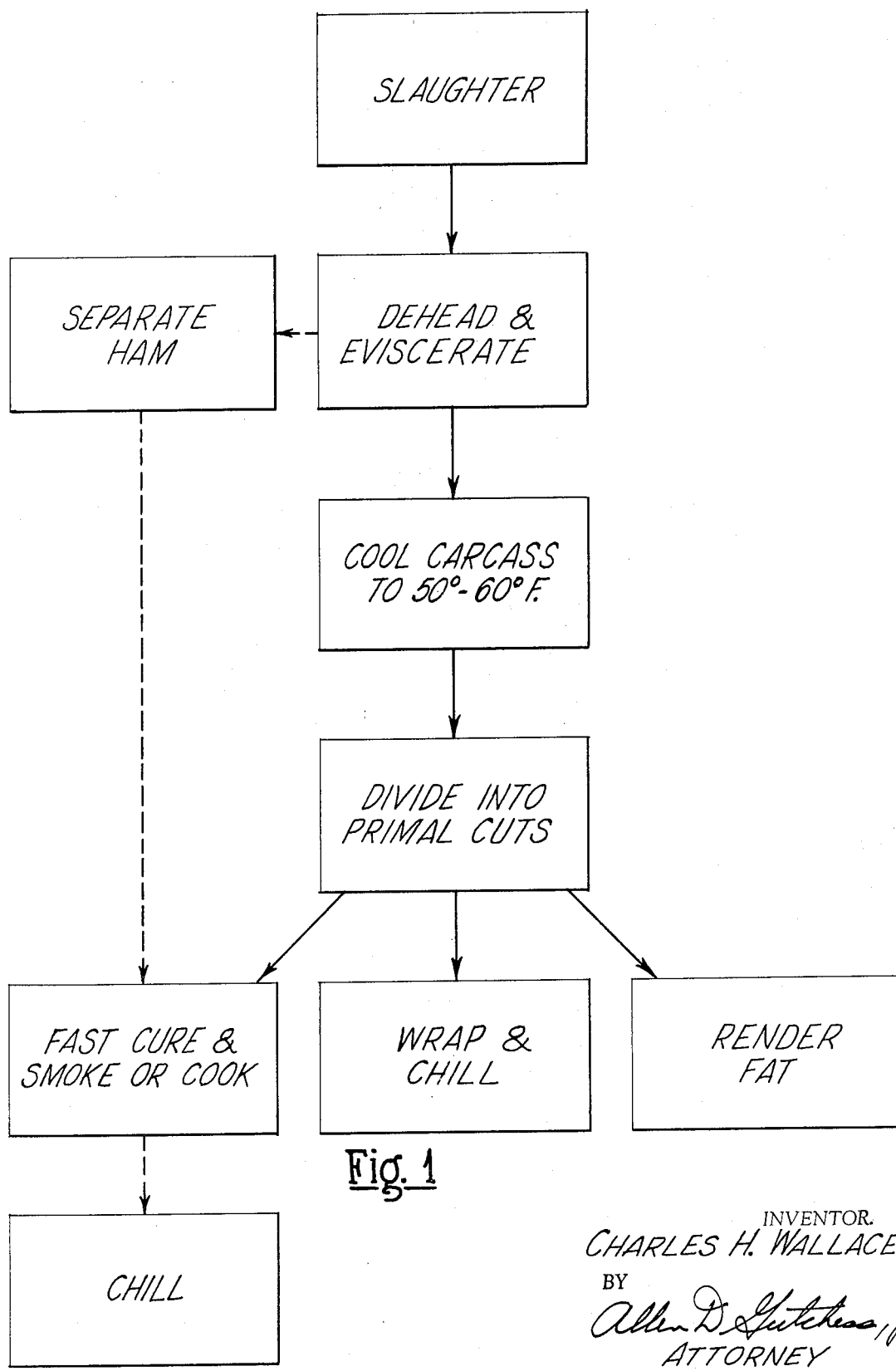
FIG. 1 is a block diagram representing the step in processing hogs in accordance with the invention.

In accordance with the invention and referring to FIG. 1, the carcasses or carcass halves are rapidly cooled only to a surface temperature of 27° to 65° F. and preferably about 50°–60° F. from an internal temperature of about 95° F. and a surface temperature of about 85° F. This cooling step is used only to give the meat and fat a certain degree of firmness which it does not have at the upper temperatures approximating body temperature of the hog. At the upper temperatures, the meat and fat are too flaccid to enable smooth, precise cuts to be made in the carcass for the purpose of breaking up the carcass into primal or market cuts.

The cooling preferably is accomplished in a continuous tunnel or cabinet through which the carcasses are conveyed. The cooling is achieved quickly by first flowing water, and then subsequently recirculated brine, over the carcasses in a substantially continuous film. With this arrangement, the required amount of chilling can be accomplished in only about twenty-five minutes and, further, the use of liquid for the cooling medium substantially eliminates shrinking. Quick chilling can also be achieved using liquid or gaseous carbon dioxide, nitrogen, freon, or a cold air blast.

Figure 2:
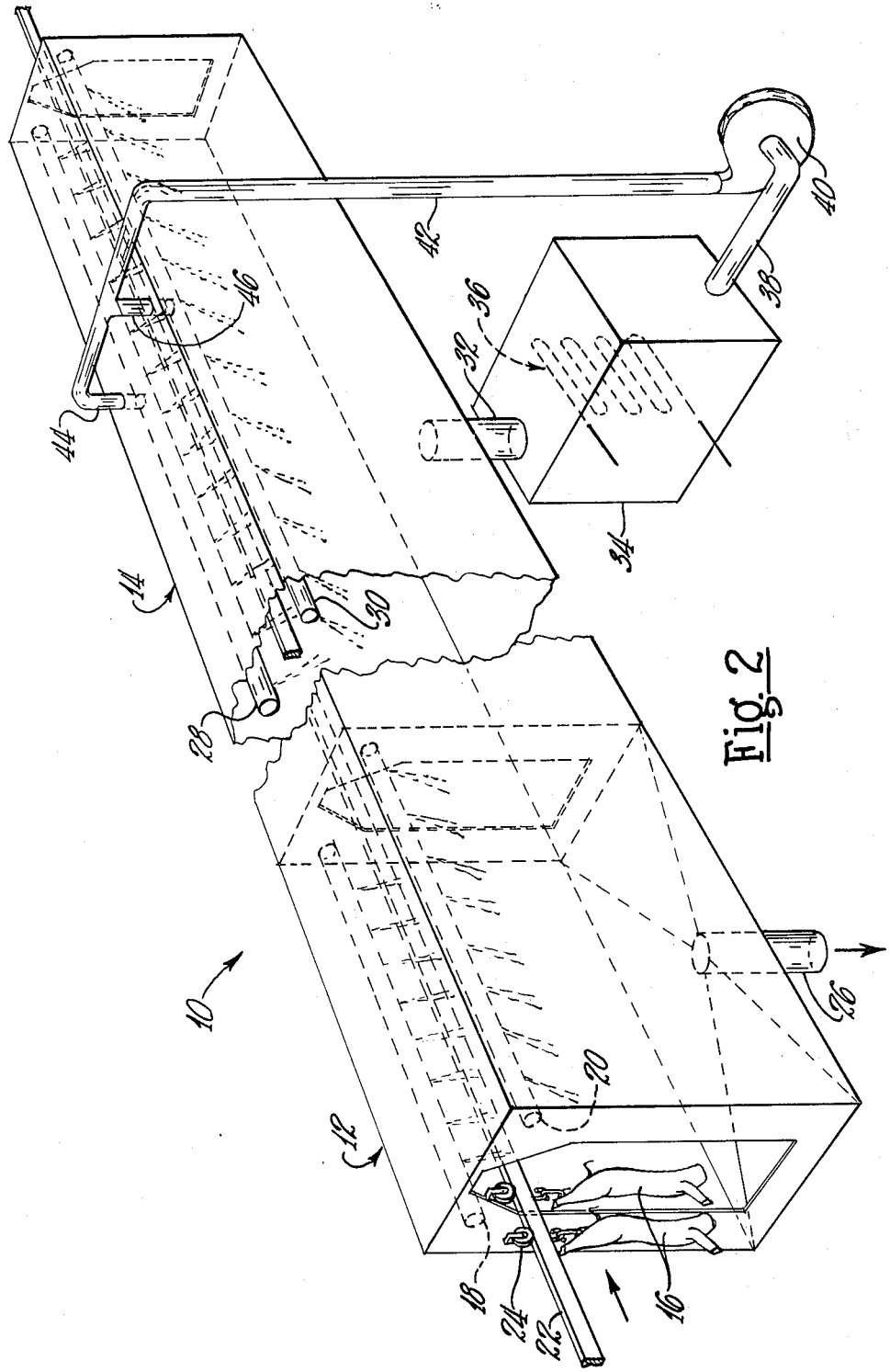
FIG. 2 is a somewhat schematic view in perspective of a cooling tunnel for cooling hog carcasses immediately after de-heading and eviscerating.

Referring to FIG. 2, a cooling tunnel or cabinet indicated at 10 includes a first section 12 in which water is flowed over carcasses 16 and a second section 14 in which brine is flowed over the carcasses and recirculated. The water used is preferably potable or tap water, the temperature of which will vary somewhat over the seasons of a year. This water is preferably under enough pressure to have an impinging action that will rinse loose hair and blood from the carcasses. Hence, this water serves a double function. As shown, the water can be supplied through a pair of spray pipes 18 and 20 located on each side of a conveyor rail 22 which extends completely through the tunnel 10 and carries the carcasses on trolley hangers 24, as is generally known in the art. The water is directed over the carcasses in uniform sprays so as to run down the surfaces thereof in substantially continuous films. This water is then simply drained to a sewer through a drain line 26 for sanitary reasons, rather than being recirculated.

The brine in the section 14 can be at a temperature of about 32°–33° F. with a strength of 15°–25° salimeters; the temperatures for the brine will depend in part on the temperature of the water used in the first section 12. The brine in the section 14 is also supplied through spray pipes 28 and 30 located on each side of the conveyor rail 22 so that it will run down the carcasses in films. However, the brine is collected in a drain line 32 (or a plurality) and recirculated through a cooling tank 34 where a suitable refrigeration coil 36 cools the brine to the desired temperature. The brine is then recirculated through an outlet line 38, a pump 40, a supply line 42, and branch lines 44 and 46 to the spray lines 28 and 30. A cooling tunnel of similar construction can be used to chill the carcasses with liquid or gaseous carbon dioxide, nitrogen or freon after the carcasses have been washed with water.

The size of the tunnel 10 will vary somewhat depending on plant capacity. Where the hogs are cooled to a surface temperature of 27° to 65° F. in about twenty-five minutes, and with a plant capacity of about four hundred hogs per hour, the section 12 can have a length of forty-two feet and the section 14 a length of one hundred sixty-seven feet, with a foot between the sections.

The cooling tunnel exit can be at the cutting room, in which the cooled carcass is immediately divided into the primal cuts. The cuts into which the carcass is usually divided include hams, picnics, bellies, pork loins, Boston butts, ribs, fatbacks, and clear plates. After being divided, cuts, representing about seventy-two percent of the carcass, by weight, require heating, while the remainder are chilled. The cuts that are heated, of course, begin from an internal temperature in the order of 70° F. rather than 38° F. or lower.

The cooling requirements for reducing the carcass temperature to 70° F. internally can be reduced if the hams are cut and separated from the remainder of the carcass while still at carcass temperature or thereabouts. These hams can then be subsequently smoked at 137° to 142° F. or fully cooked at 152° to 160° F., starting from a temperature of about 95° F. internally, rather than 70° F. To achieve a clean cut at the upper temperatures, it is necessary that the carcass be firmly held on each side of the cutting line which is in the proximity of the aitch bone. To accomplish this continuously, each carcass half can be inverted and held with the ham hanging down as disclosed in my co-pending patent application, ser. No. 47,216, filed June 18, 1970, entitled "Method and Apparatus for Slaughtering Animals," now Pat. No. 3,657,-770. The ham can then be severed by a knife located on one or both sides thereof which moves in substantially a horizontal path. Alternatively, the carcass half can be moved slowly with the flat side down over a table with a chopping blade having concave pressure plates on each side thereof then moved into contact with the carcass, with the carcass being held between the pressure plates and table as the cutter severs the ham from the remaining carcass. In either case, the remaining carcass can be then be moved in a continuous manner into the cooling chamber or tunnel.

A representative means for quickly separating the ham from the remainder of the carcass is shown in FIG. 3. In this instance, the carcass 16 is held in an inverted position by a thong 48 connected to a conveyor hanger 50 on a rail 52, along which the carcass 16 is conveyed toward the cooling tunnel. Since the carcass 16 is substantially at body temperature at this time, after de-heading, eviscerating, and splitting the carcass in two, it must be held firmly while the ham is cut off. To achieve this, a flat back-up or supporting plate 54 is located immediately to one side of the conveyor rail 52 and supports the split or flat side of the carcass during the cutting operation. A cutting device indicated at 56 is located on the other side of the carcass and, in this instance, is suspended by a cable 58 from an overhead pneumatic balancing hoist 60 of a type commercially available. The hoist 60 can be supported by a hanger 62 from a side rail 64 so that the device 56 can be moved along with the carcass 16 as the cut is being made, even though the carcass will only move a short distance in that time. The balancing hoist 60 enables the cutting device 56 to be manipulated by an operator as though it weighed only a few pounds even though, in fact, it may weigh substantially more than a hundred.

The device 56 includes a frame 66 suspended by the cable 58 with a rotating circular knife or saw blade 68 projecting forwardly of the device 56 and driven through a flexible cable 70 by a motor 72. The blade 68 is capable of cutting through both the meat and the aitch bone of the carcass relatively cleanly and quickly. Because the forward edge of the blade must go completely through the carcass and because the carcass is backed up immediately by the plate 54, the plate 54 has slots 74 therein to receive the blade. Since the carcasses are of different lengths and the position in which they hang relative to the hanger 50 by means of the thong 48 may vary, a plurality of the slots 74 are provided, in a staggered relationship, so that the cutting device 56 can be properly aligned with the desired position on the carcass at which the ham is to be separated, and at the same time be aligned with one of the slots 74. The device 56 is easily manipulated up and down to the desired cutting position by the operator with the aid of the balancing hoist 60.

Because of the flaccid condition of the meat at this point, it is essential that the carcass be firmly held on the outer side as well as being backed up by the plate 54 on the split or inner side. For this purpose, a pair of concave pressure plates 78 and 80 are located above and below the blade 68. These engage the carcass immediately above and below the separation or cutting line and hold the meat firmly during the cut. The pressure plates 78 and 80 can be mounted by swivel joints 82 and 84 on spring-loaded rods 86 and 88 which are telescopically received in upper and lower arms 90 and 92 of the frame 66, with the rods being urged outwardly by coil springs located therein. The springs and the rods 86 and 88 enable the pressure plates 78 and 80 to yield as the knife 68 is pushed forwardly into the carcass by the operator, so that the pressure is maintained on the carcass by the concave plates throughout the cutting operation.

After cooling and breaking the carcass into primal cuts, the cuts that are to be sold fresh are wrapped in a moisture-proof film by an automatic wrapping machine. These cuts are then conveyed through a continuous dry-chill cabinet or tunnel using cold air, carbon dioxide, nitrogen or freon as the chilling medium to lower the internal temperature of the cuts to about 34° F. The protective film eliminates shrinkage during this secondary chill. These chilled cuts are graded by weight ranges and packed in shipping boxes at the discharge end of the chill conveyor. They can then be stored on pallets in a conventional cooler at 34° F.

Hams are immediately pumped with a brine solution. This solution ordinarily comprises water, salt, and sugar, and, in accordance with the invention, is first heated to a temperature of 120° to 170° F. The brine solution is injected into the hams, for example, by means of commercially available pumps which inject the solution through a multiplicity of hollow needles into the interior of the ham. A ten-pound ham, by way of example, with an internal temperature of 70° F., will be pumped with four pounds of the hot, 170° F. brine solution to substantially instantaneously increase the internal temperature of the ham to as much as 120° F. If this ham is to be marketed as a bone-in, smoked ham, it can then be inserted in a stocking and hung on a smoke tree in a smokehouse. The ham can be smoked or cooked to a final temperature of 137° to 160° F. in less than five hours, compared to about eleven hours otherwise required to smoke and cook the ham when starting with an internal temperature of 38° F. The facility can then produce four batches of hams per day rather than two, for example, with the double capacity achieved.

If further initial heating of the hams is desired, this can be accomplished by injecting them with additional brine solution through the hollow needles again. While most of the brine almost immediately drains from the hams, if an excess remains, particularly after the second injection, some of the brine can be squeezed out in a press having parts molded to the approximate shape of the ham to avoid distortion thereof during the pressing or squeezing operation.

Rather than injecting the hams with hot brine the second time, the hollow injecting needles can be projected completely through the hams with the brine then passed through into a collecting tank, serving only as a heat exchange medium in that case. In another technique, the hams can be heated initially with the hollow needles projecting completely through them, then injected with the hot brine solution, and finally, if desired, heated further by projecting the needles completely through them and using the brine once again only as a heat exchange medium. The heating achieved by the brine also can be supplemented or replaced by hot needles heated by electricity, for example.

Referring to FIG. 4, the apparatus shown is suitable for injecting brine into hams and initial heating, in which case the apparatus is also suitable for any other cuts besides hams which are to be cooked. In this instance, a multiplicity of hollow needles 94 are shown extending completely through a ham 96 or other cut with the exception of one of the needles which has encountered a bone in the ham. The needles are part of a commercially available device, obtainable from several companies, which are used ordinarily merely to inject brine solution into the hams at ambient temperatures. The needles 94 are supported by a manifold head 98 which moves the needles into the cut and resiliently supports them so that they can yield when encountering a bone or the like. The head 98 also constitutes a source of supply of brine which is forced through openings adjacent the pointed ends of the needles.

The brine from the needles is collected in a sump 100 below a supporting gate 102 for the hams and from the sump is fed into a heat exchange tank 104 containing a heated coil 106 which maintains the temperature of the brine in a range of 120° to 170° F. The hot brine is then supplied through an inlet line 108 to a pump 110 which forces the brine through a line 112 back to the manifold assembly 98.

For cuts which are to be heated, a modified device shown in FIG. 5 can be employed. This includes a multiplicity of needles 114 containing electrically-resistant elements through which electricity is supplied by leads 116 and 118 connected in parallel, in this instance, to main lines 120 and 122. These needles are capable of heating the cuts into which they are injected rapidly similar to the needles 94. The minute holes formed by the needles 94 or 114 disappear soon after the needles are removed.

With the ten-pound ham pumped with four pounds of brine, as discussed above, the resulting smoked ham will have a market weight of eleven pounds, an increase of ten percent, as allowed by law. The increased weight represents the amount of brine solution retained. If this ham had been chilled to 38° F. by conventional procedures, with an average two percent shrinkage, the weight of the ham would have then been 9.8 pounds. Since this weight cannot legally be increased by more than ten percent, the final weight of the chilled ham would have been a maximum of 10.78 pounds compared to eleven pounds, with an advantage of 2.2 percent in weight increase achieved by use of the method of the invention.

Separate conveyors and smoking tunnels can be used for picnics and for bellies with both being initially similarly heated by the hot brine solution and hollow needles, or by needles heated by other means.

The various cuts which have been cooked or smoked are chilled to an internal temperature of about 35° F. prior to being shipped. To increase the rate of cooling, hollow needles through which cold brine is passed can be projected through the cuts until brought down to an internal temperature of about 800° F. This is about the minimum practical temperature for this cooling technique since, if the meat is cooled to a lower temperature, it will be sufficiently rigid that the holes from the needles will be visible and produce an unacceptable appearance from a consumers standpoint. After reaching 80° F., the cuts can then be wrapped and chilled with the use of high-velocity cold air, carbon dioxide, nitrogen or freon as discussed in connection with the chilling of the fresh cuts.

Fat which is cut from the carcasses in the form of fatback and clear plates when the carcass is divided into the primal cuts will also be at a temperature of about 70° F. This fat is immediately rendered in a continuous process, being collected and ground through a grinder head and discharged into a stainless steel screw conveyor. In the screw conveyor, steam is injected into the fat as it is conveyed to a rendering tank. With the higher initial temperature of the fat and the steam added during conveying, the time for rendering is substantially reduced, being about one-third as long as otherwise required.

Referring to FIG. 6, the fat cuts and trimmings are placed in a hopper 124 and forced by an auger 126 driven by a motor 128 through a grinder plate 130 having openings 132 therein, preferably with diameters of about three-eights inch. The ground fat is then discharged into a hopper 134 and transported by a twelve-inch stainless steel screw conveyor 136, driven by a motor 138, to a rendering tank 140. During conveyance through the conveyor 136, the ground fat is subjected to steam supplied near the hopper 134 through line 142. The higher initial temperature along with the steam supplied during conveying enable the fat to be rendered in a substantially reduced amount of time.

Various modifications of the above described embodiment of the invention will be apparent to those skilled in the art, and it is to be understood that such modifications can be made without departing from the scope of the invention, if they are within the spirit and the tenor of the accompanying claims.

I claim:

1. A method of processing hogs which comprises slaughtering the hogs, eviscerating the hog carcasses, rapidly cooling the carcasses by directing a chilling fluid substance over the carcasses for a time sufficient to cause the surface temperature to be about 27° F. to about 65° F. while leaving the internal temperature to be about 70° F. to about 95° F. and substantially eliminating shrinkage of the carcasses, immediately cutting the carcasses into primal portions, heating certain of said cut portions, and chilling other of said cut portions.

2. A method according to claim 1 wherein the heating step comprises injecting a plurality of hollow needles into the certain portions of the carcass and flowing a hot brine solution through the needles.

3. A method according to claim 1 characterized further by separating the hams from the carcasses prior to rapidly cooling the carcasses.

4. A method according to claim 1 wherein the rapid cooling of the carcasses is achieved by passing the carcasses through a cooling tunnel, applying tap water under pressure to rinse the carcasses, and subsequently directing the chilling fluid substance over the carcasses to reduce the surface temperature prior to cutting the carcasses into the primal portions.

5. A method according to claim 1 wherein the heating step comprises injecting a plurality of heated needles into the certain portions of the carcass prior to subsequent heating of the certain portions.

References Cited

UNITED STATES PATENTS

| 2,387,221 | 10/1945 | Williams et al. | 99—107 |
| 2,483,064 | 9/1949 | Reich | 99—197 X |
| 2,937,094 | 5/1960 | Rupp et al. | 99—159 |
| 3,078,287 | 2/1963 | Downing | 99—108 X |
| 3,130,057 | 4/1964 | Williams | 99—108 X |
| 3,137,582 | 6/1964 | Szczesniak | 99—197 X |

OTHER REFERENCES

American Meat Institute Foundation, "The Science of Meat and Meat Products," 1960, published by W. H. Freeman and Co., San Francisco, p. 335, copy in GR. 170, U.S. Pat. Off.

HYMAN LORD, Primary Examiner